(12) United States Patent
Dermeche

(10) Patent No.: US 10,322,660 B1
(45) Date of Patent: Jun. 18, 2019

(54) TRACTOR TRAILER CONVEYOR SYSTEM

(71) Applicant: Mohamed Dermeche, Bayonne, NJ (US)

(72) Inventor: Mohamed Dermeche, Bayonne, NJ (US)

( * ) Notice: Subject to any disclaimer, the term of this patent is extended or adjusted under 35 U.S.C. 154(b) by 242 days.

(21) Appl. No.: 15/444,447

(22) Filed: Feb. 28, 2017

(51) Int. Cl.
| | |
|---|---|
| *B60P 1/38* | (2006.01) |
| *B65G 13/00* | (2006.01) |
| *B65G 15/00* | (2006.01) |
| *B65G 39/02* | (2006.01) |
| *B65G 43/00* | (2006.01) |
| *B65G 43/08* | (2006.01) |
| *B60P 1/52* | (2006.01) |

(52) U.S. Cl.
CPC .................. *B60P 1/38* (2013.01); *B60P 1/52* (2013.01); *B65G 13/00* (2013.01); *B65G 15/00* (2013.01); *B65G 39/02* (2013.01); *B65G 43/00* (2013.01); *B65G 43/08* (2013.01)

(58) Field of Classification Search
CPC ... B60P 1/38; B60P 1/52; B65G 67/20; B65G 67/08
See application file for complete search history.

(56) References Cited

U.S. PATENT DOCUMENTS

| | | | | |
|---|---|---|---|---|
| 4,441,848 | A * | 4/1984 | Bailey | B60P 1/38 414/439 |
| D293,384 | S | 12/1987 | Brule | |
| 5,718,325 | A | 2/1998 | Doster | |
| 6,655,893 | B2 | 12/2003 | Kelly | |
| 7,108,125 | B2 | 9/2006 | Gilmore | |
| 7,370,753 | B2 | 5/2008 | Yang | |
| 7,909,153 | B2 | 3/2011 | Pogue | |
| 8,915,347 | B2 * | 12/2014 | Hoppel | B65G 47/18 198/311 |
| 9,315,328 | B2 | 4/2016 | Baek | |

FOREIGN PATENT DOCUMENTS

EP          0342636 A2    11/1989

* cited by examiner

*Primary Examiner* — Mark C Hageman

(57) ABSTRACT

The tractor trailer conveyor system is installed as a flooring surface within the trailer. The tractor trailer conveyor system allows for the loading and unloading of cargo without requiring entrance into the trailer. Cargo is loaded onto the tractor trailer conveyor system from the rear door of the trailer. The conveyor system then transports the cargo towards the front of the trailer until adequate space has been made within the trailer to receive the next cargo item that is to be loaded onto the trailer. The same procedure is used to unload the trailer using the tractor trailer conveyor system with the exception that the direction of movement of the flooring is reversed. The tractor trailer conveyor system comprises a conveyor system and a control system. The conveyor system transports the cargo loaded within the trailer. The control system is used to operate the conveyor system.

11 Claims, 7 Drawing Sheets

TRACTOR TRAILER CONVEYOR SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting and vehicles in general, more specifically, a vehicle for transporting loads that is modified to facilitate loading or unloading.

SUMMARY OF INVENTION

The tractor trailer conveyor system is configured for use with a trailer. The tractor trailer conveyor system is installed as the flooring surface within the trailer. The flooring surface provided by the tractor trailer conveyor system moves in the manner of a conveyor. The tractor trailer conveyor system allows for the loading and unloading of cargo, including, but not limited to cartons and pallets, without requiring people, forklifts or pallet jacks to enter the trailer. Cargo is loaded onto the tractor trailer conveyor system from the rear door of the trailer. The conveyor system then transports the load towards the front of the trailer until adequate space has been made within the trailer to receive the next cargo item that is to be loaded onto the trailer. The same procedure is used to unload the trailer using the tractor trailer conveyor system with the exception that the direction of movement of the flooring is reversed. The tractor trailer conveyor system comprises a conveyor system and a control system. The conveyor system transports the loaded items within the trailer. The control system is used to operate the conveyor system.

These together with additional objects, features and advantages of the tractor trailer conveyor system will be readily apparent to those of ordinary skill in the art upon reading the following detailed description of the presently preferred, but nonetheless illustrative, embodiments when taken in conjunction with the accompanying drawings.

In this respect, before explaining the current embodiments of the tractor trailer conveyor system in detail, it is to be understood that the tractor trailer conveyor system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tractor trailer conveyor system.

It is therefore important that the claims be regarded as including such equivalent construction insofar as they do not depart from the spirit and scope of the tractor trailer conveyor system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
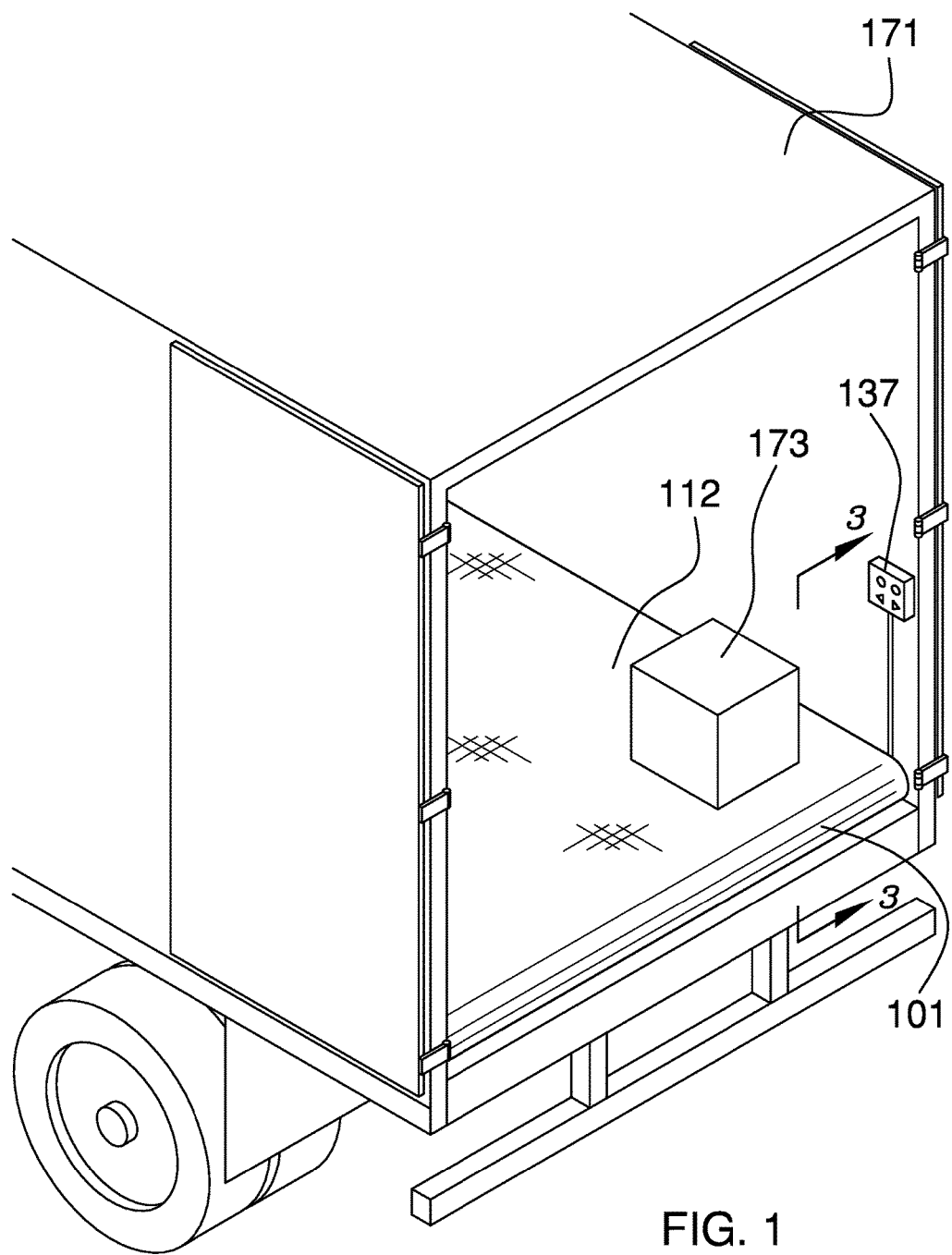
FIG. 1 is a perspective view of an embodiment of the disclosure.
Figure 2:
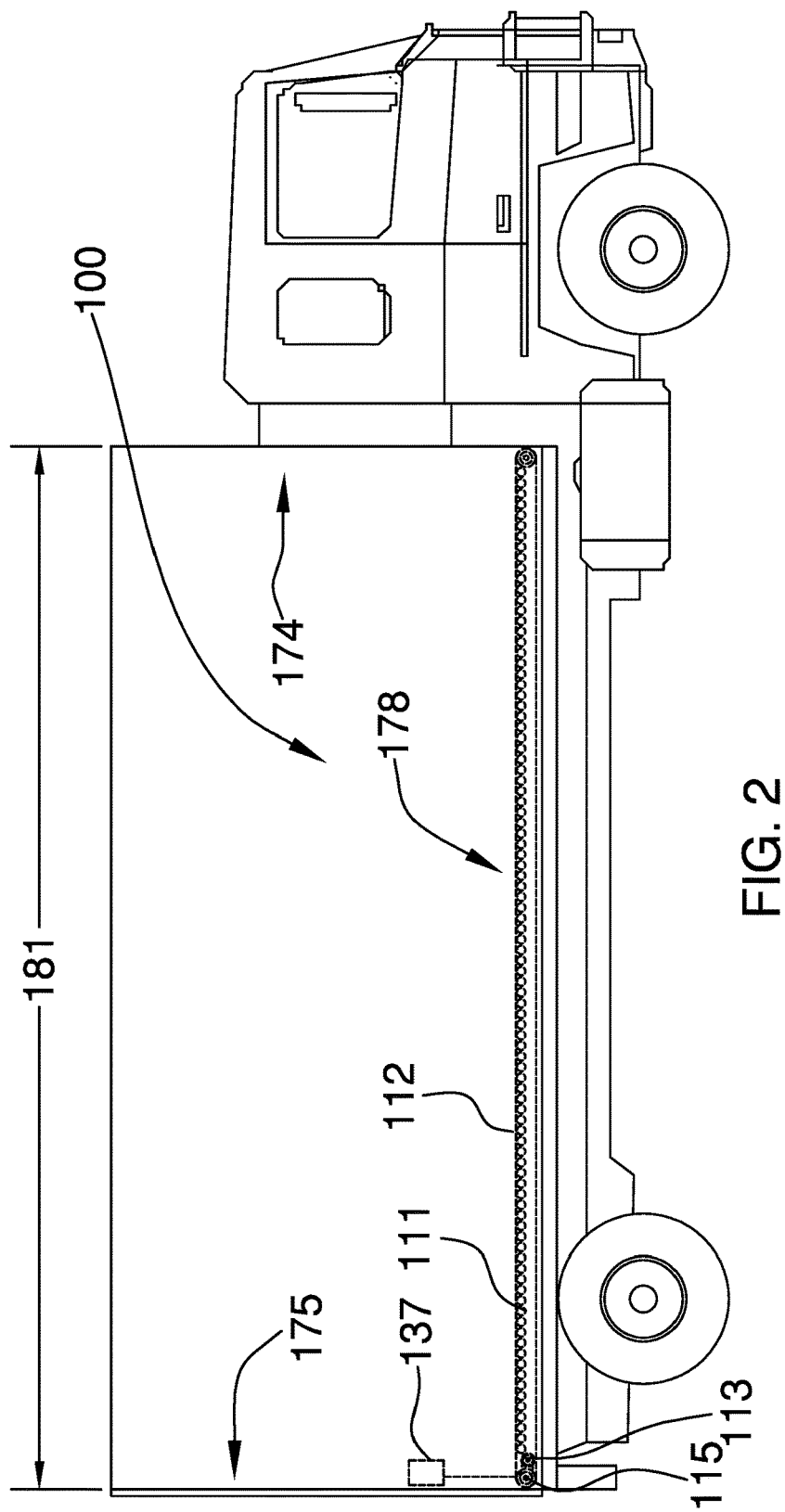
FIG. 2 is a side view of an embodiment of the disclosure.
Figure 3:
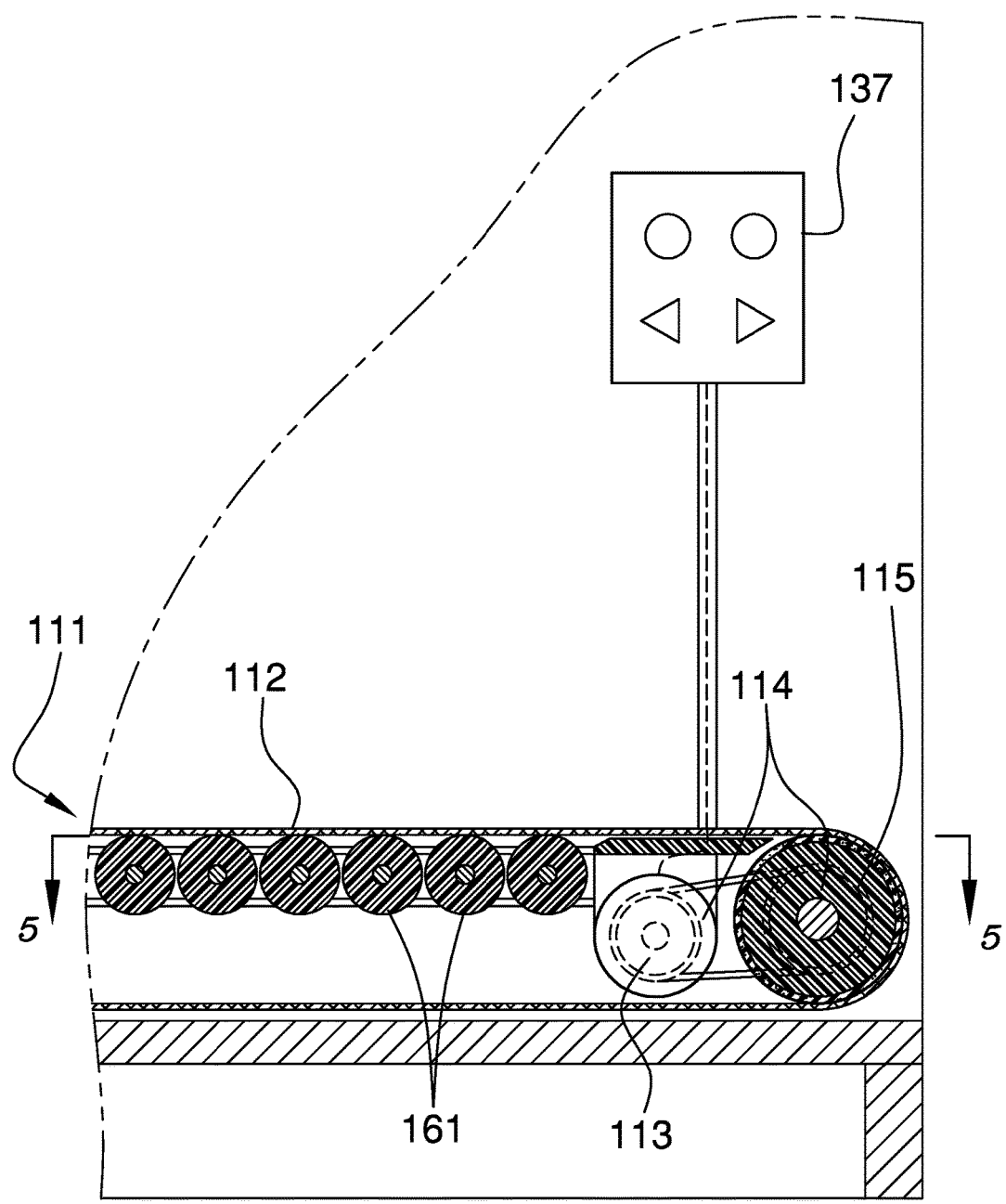
FIG. 3 is a cross-sectional view of an embodiment of the disclosure across 3-3 as shown in FIG. 1.
Figure 4:
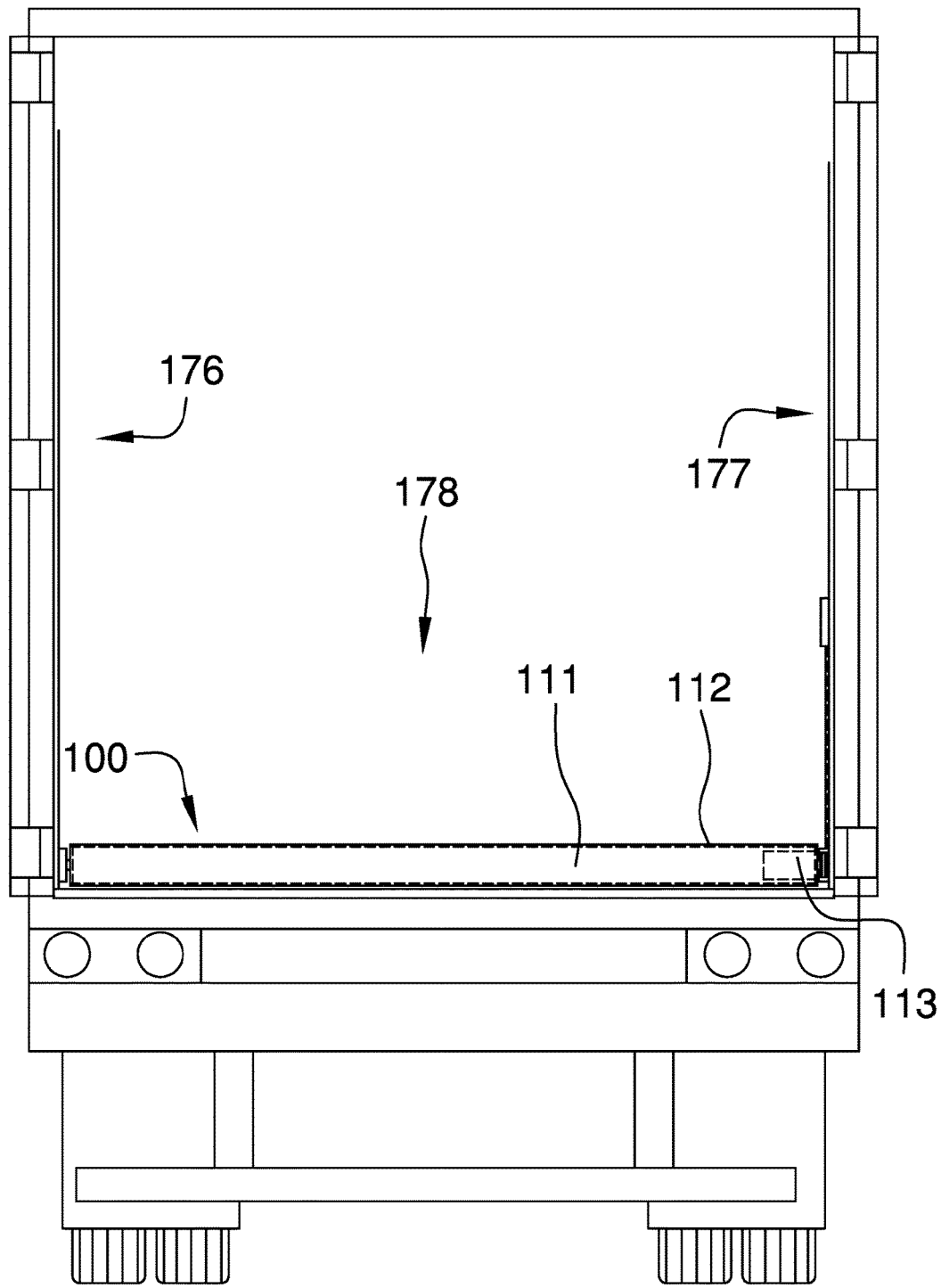
FIG. 4 is a rear view of an embodiment of the disclosure.
Figure 5:
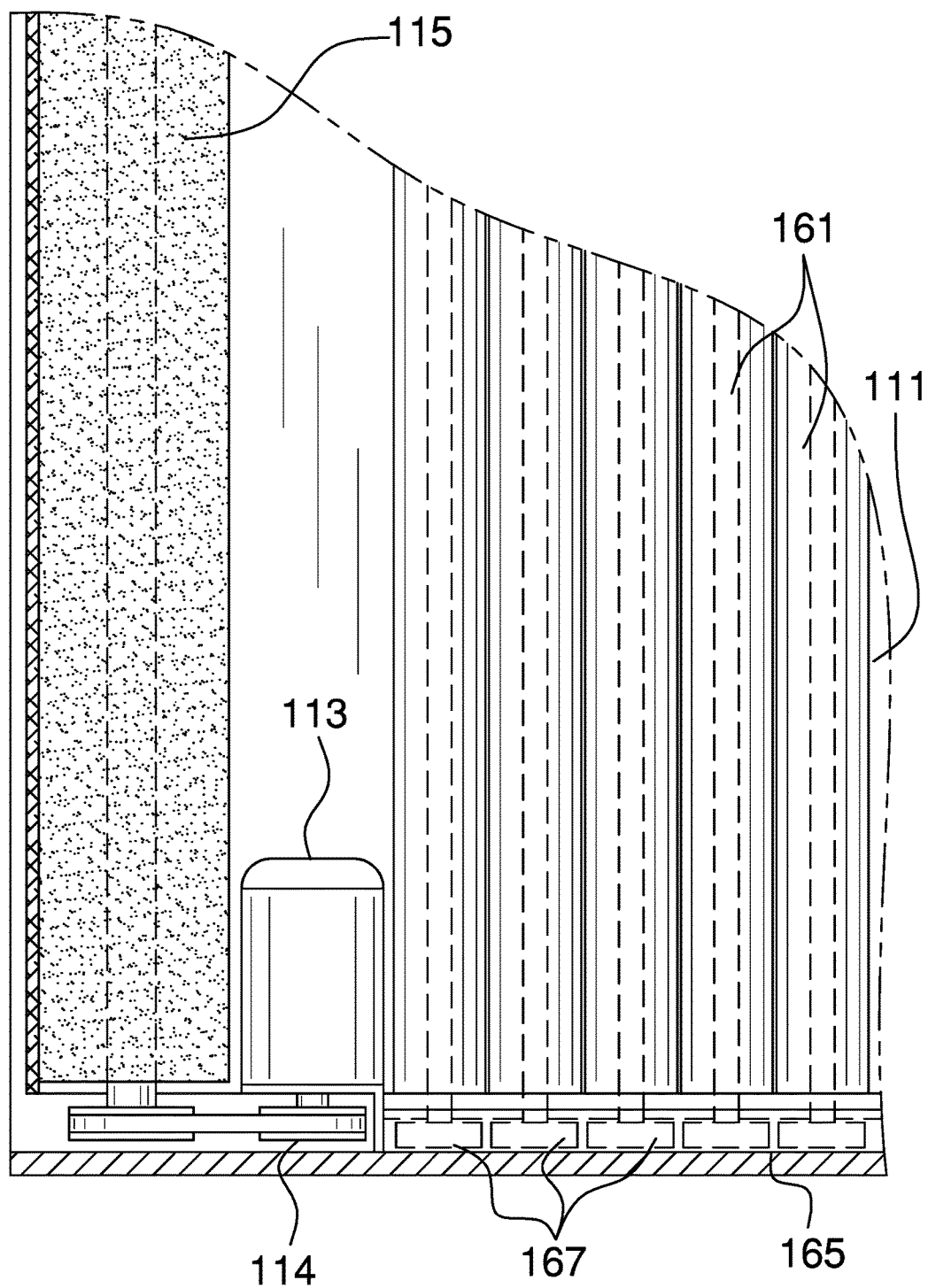
FIG. 5 is a cross-sectional view of an embodiment of the disclosure across 5-5 as shown in FIG. 3.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 7.

The tractor trailer conveyor system 100 (hereinafter invention) is configured for use with a trailer 171. The invention 100 is installed as the flooring 178 surface within the trailer 171. The trailer 171 is a towed wheeled vehicle within which cargo 173 is stored for transport. The flooring 178 surface provided by the invention 100 moves in the manner of a conveyor. The invention 100 allows for the loading and unloading of cargo 173, including, but not limited to cartons and pallets, without requiring people, forklifts or pallet jacks to enter the trailer 171. Cargo 173 is loaded onto the invention 100 from the rear 175 door of the trailer 171. Within this disclosure, cargo 173 is a generic term that refers to the goods that are being loaded, carried and unloaded on the trailer 171. The conveyor system 101 then transports the cargo 173 towards the forward 174 of the trailer 171 until adequate space has been made within the trailer 171 to receive the next cargo 173 item that is to be loaded onto the trailer 171. The same procedure is used to unload the trailer 171 with the exception that the direction of movement of the flooring 178 is reversed. The invention 100 comprises a conveyor system 101 and a control system 102. The conveyor system 101 transports the cargo 173 loaded within the trailer 171. The control system 102 is used to operate the conveyor system 101.

Within this disclosure, the tractor electrical system 172 is an electrical power system that is provisioned by a tractor that is towing the trailer 171.

The trailer 171 is further defined with a forward 174 direction, a rear 175 direction, a left 176 direction, a right 177 direction, and a flooring 178. The trailer 171 is further defined with a length 181 and a width 182. The forward 174 refers to a direction and a location within the trailer 171 that is proximal to where the trailer 171 is connected to the tractor. The rear 175 refers to a direction and a location within the trailer 171 that is distal from and opposite to the forward 174. The left 176 refers to the side of the trailer 171 that is to the driver's left 176 when the trailer 171 is in forward 174 motion. The right 177 refers to the side of the trailer 171 that is to the driver's right 177 when the trailer 171 is in forward 174 motion. The flooring 178 refers to the inferior surface of the interior space formed by the trailer 171 upon which cargo 173 is placed. The length 181 refers to the span of distance from the rear 175 of the trailer 171 to the forward 174 of the trailer 171. The width 182 refers to the span of distance from the left 176 of the trailer 171 to the right 177 of the trailer 171.

The conveyor system 101 is a looped surface that is mechanically driven such that the looped surface can be moved through a continuous loop. The conveyor system 101 is sized and installed such that the conveyor system 101 replaces the flooring 178 of the trailer 171. The conveyor system 101 moves the cargo 173 stored within the trailer 171 in the forward 174 direction and the rear 175 direction. The conveyor system 101 comprises a roller bed 111, a carrier belt 112, a motor 113, a drive pulley 114, and a spindle pulley 115.

The roller bed 111 is a structure around which the carrier belt 112 is looped. The roller bed 111 forms the supporting platform upon which the cargo 173 is supported. The roller bed 111 comprises a plurality of rollers 161, a left roller guide 162, and a right roller guide 163.

The carrier belt 112 is a flexible sheeting that moves in a loop around the roller bed 111. The carrier belt 112 moves through a continuous loop during the operation of the invention 100. The cargo 173 that is placed on the carrier belt 112 is pulled by the carrier belt 112 in the forward 174 direction and the rear 175 direction of the trailer 171. The carrier belt 112 is sized such that the carrier belt 112 essentially forms the flooring 178 surface along the length 181 and the width 182 of the trailer 171.

The motor 113 is a readily and commercially available electrical motor that is used to rotate the carrier belt 112 through the continuous loop. The drive pulley 114 is a pulley that is attached to the motor 113 such that the rotation of the motor 113 rotates the drive pulley 114.

The spindle pulley 115 is a knurled roller. As shown most clearly in FIG. 3, the spindle pulley 115 is attached to the drive pulley 114 in the manner of a belt drive such that the rotation of the drive pulley 114 will rotate the spindle pulley 115. The carrier belt 112 is looped around the roller bed 111 and the spindle pulley 115 with enough tension such that the knurls of the spindle pulley 115 will press into the surface of the carrier belt 112. This tension provides the spindle pulley 115 adequate tension to allow the rotation of the spindle pulley 115 to rotate the carrier belt 112 while the carrier belt 112 is loaded with cargo 173.

Methods to form and install a carrier belt 112 as described in this disclosure are well known and documented in the mechanical and textile arts.

Each of the plurality of rollers 161 is a roller that is mounted on a shaft. Each of the plurality of rollers 161 are identical. Each of the plurality of rollers 161 is supported by the left roller guide 162 and the right roller guide 163 such that each of the plurality of rollers 161 spins freely. The shaft of each roller selected from the plurality of rollers 161 attaches to a left bearing selected from the left plurality of bearings 166 contained within the left roller guide 162. The shaft of each roller selected from the plurality of rollers 161 attaches to a right bearing selected from the right plurality of bearings 167 contained within the right roller guide 163.

The left roller guide 162 comprises a left frame 164 and a left plurality of bearings 166. The right roller guide 163 comprises a right frame 165 and a right plurality of bearings 167. The left roller guide 162 is a structure that runs along the left 176 side of the trailer 171. The left roller guide 162 supports the plurality of rollers 161. The right roller guide 163 is a structure that runs along the right 177 side of the trailer 171. The right roller guide 163 supports the plurality of rollers 161.

The left frame 164 is a rectangular structured that is formed as the rail of a T track fastener. The left frame 164 runs along the left 176 side of the trailer 171. Each of the left plurality of bearings 166 is a readily and commercially available ball bearing that is contained within the left frame 164. Each left bearing selected from the left plurality of bearings 166 attaches to the shaft of a roller selected from the plurality of rollers 161.

The right frame 165 is a rectangular structured that is formed as the rail of a T track fastener. The right frame 165 runs along the right 177 side of the trailer 171. Each of the right plurality of bearings 167 is a readily and commercially available ball bearing that is contained within the right frame 165. Each right bearing selected from the right plurality of bearings 167 attaches to the shaft of a roller selected from the plurality of rollers 161.

The control system 102 is an electric circuit that is stored within a housing 137 mounted at the rear 175 of the trailer 171. The housing 137 is a rigid casing within which the base motor control circuit 121, the remote control circuit 122, and the obstruction circuit 123 are stored and accessed.

Figure 6:
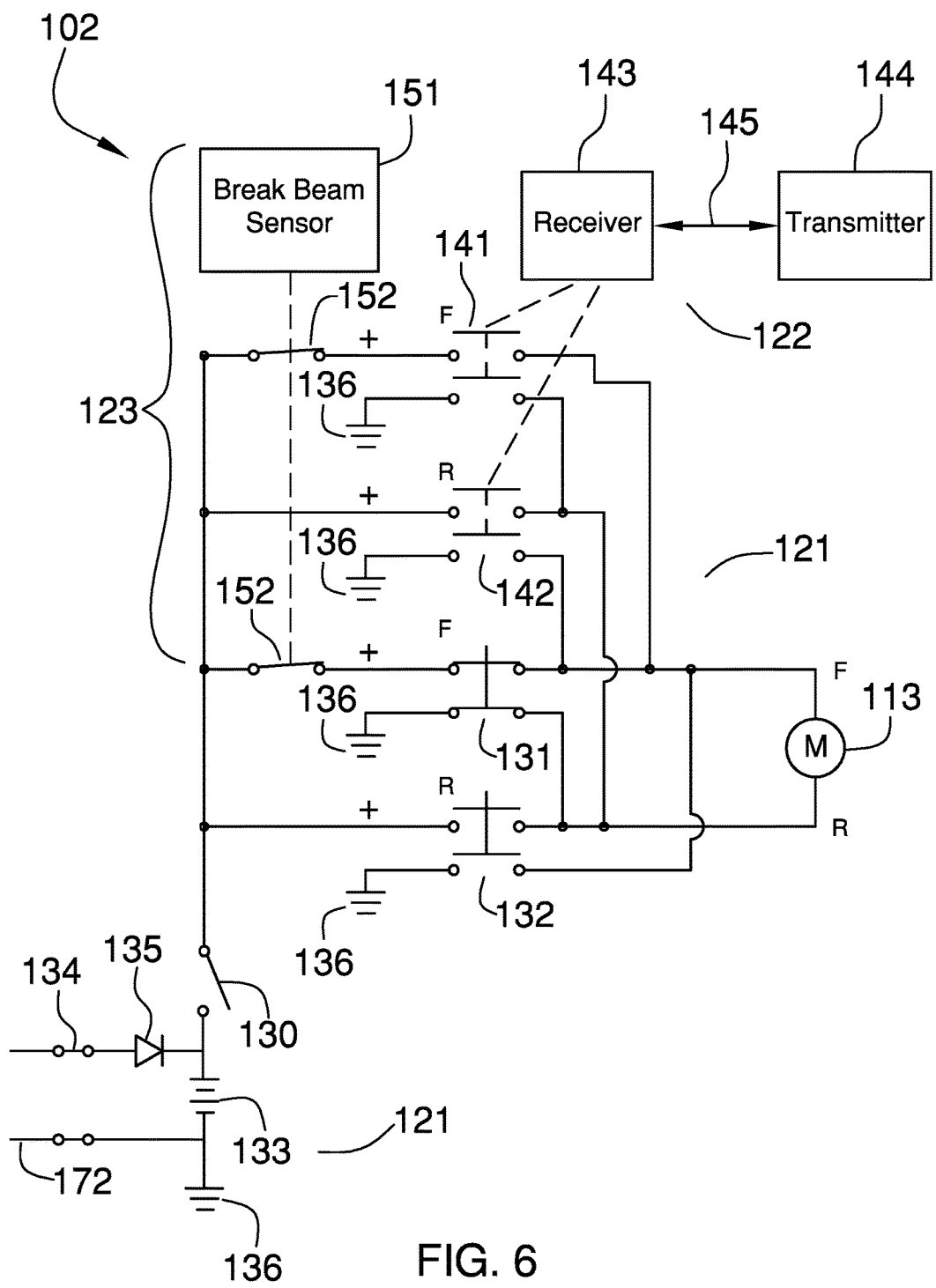
FIG. 6 is a schematic view of an embodiment of the disclosure.
Figure 7:
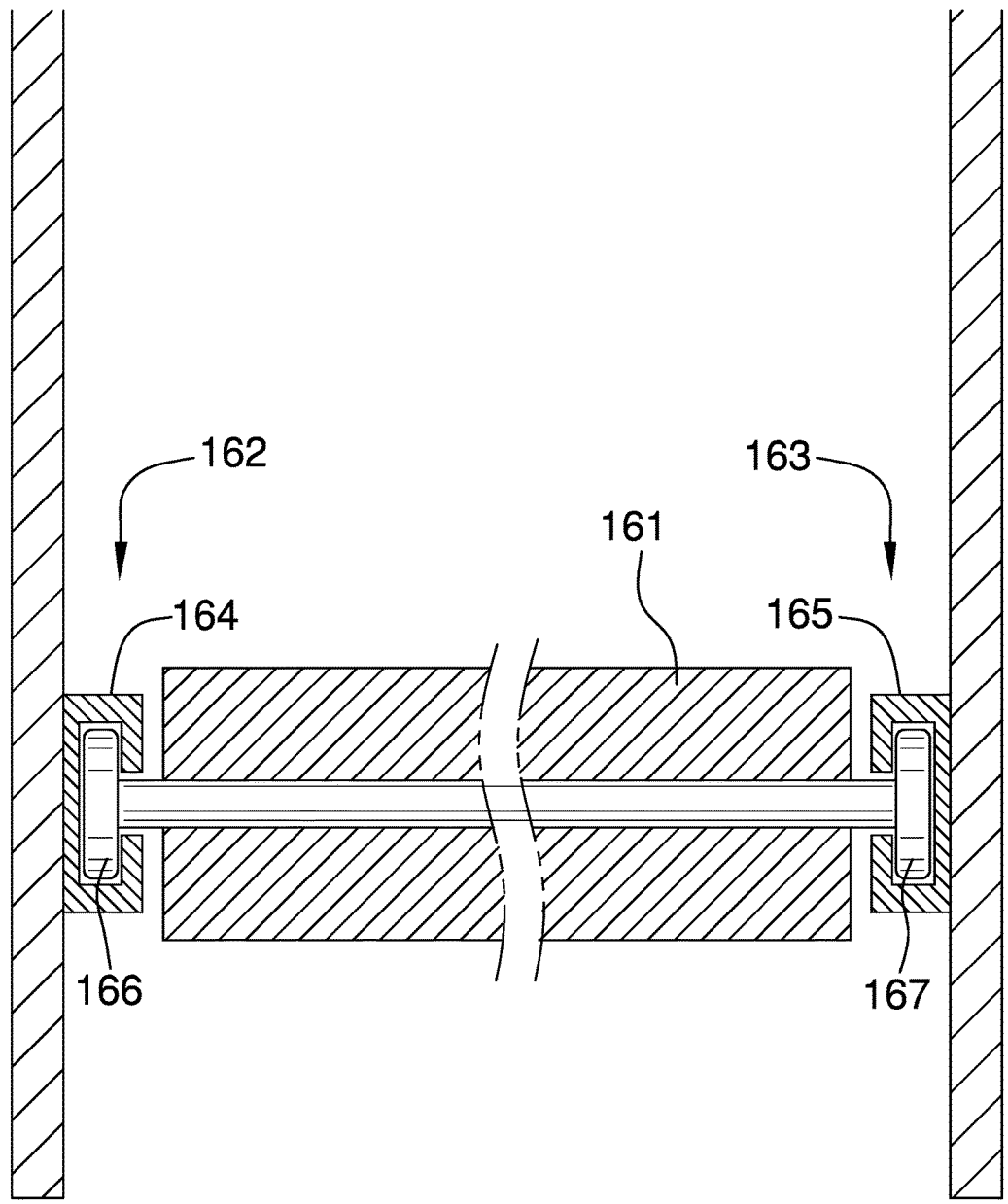
FIG. 7 is a detail view of an embodiment of the disclosure.

As shown most clearly in FIG. 6, the base motor control circuit 121 is an electrical circuit that controls the operation and the direction of rotation of the motor 113 that rotates the conveyor system 101. The control system 102 comprises a base motor control circuit 121. The base motor control circuit 121 comprises an enablement switch 130, a first load switch 131, a first unload switch 132, a battery 133, a charging connection 134, a diode 135, and an electric ground 136.

The enablement switch 130 is a readily and commercially available single pole single throw maintained switch. The enablement switch 130 is essentially the power switch of the control system 102. The first load switch 131 is a readily and commercially available double pole single throw normally open momentary switch. The first load switch 131 rotates the motor 113 to move the carrier belt 112 in the forward 174 direction. The first unload switch 132 is a readily and commercially available double pole single throw normally open momentary switch. The first unload switch 132 rotates the motor 113 to move the carrier belt 112 in the rear 175 direction.

The battery 133 is a commercially available battery 133. The chemical energy stored within the battery 133 is renewed and restored through use of the tractor electrical system 172. The charging connection 134 forms the electrical connection between the battery 133 and the tractor electrical system 172. The charging connection 134 is an electrical circuit that reverses the polarity of the battery 133 and provides the energy necessary to reverse the chemical processes that the battery 133 initially used to generate the electrical energy. This reversal of the chemical process creates a chemical potential energy that will later be used to generate electricity. The charging connection 134 is a commercially available electrical connection that attaches the battery 133 to the tractor electrical system 172. The diode 135 is a commercially available electrical device that prevents the flow of electrical current from the battery 133 into the tractor electrical system 172.

The electric ground 136 is a common voltage reference that is used throughout the base motor control circuit 121, the remote control circuit 122, and the obstruction circuit 123.

In a second potential embodiment of the disclosure, the control system 102 further comprises a remote control circuit 122. The remote control circuit 122 is an optional electrical circuit that allows the base motor control circuit 121 to be operated using a radio frequency transmitter 144 and receiver 143. The remote control circuit 122 comprises a second load switch 141, a second unload switch 142, a receiver 143, and a transmitter 144. When used, the remote control circuit 122 is incorporated into the base motor control circuit 121. The second load switch 141 is a radio controlled double pole single throw normally open momentary switch. The second load switch 141 rotates the motor 113 to move the carrier belt 112 in the forward 174 direction.

The second load switch 141 is a radio controlled double pole single throw normally open momentary switch. The second unload switch 142 rotates the motor 113 to move the carrier belt 112 in the rear 175 direction. The receiver 143 is a radio frequency receiver 143 that receives control signals 145 from the transmitter 144. The control signals 145 initiates the circuits that open and close the second load switch 141 and the second unload switch 142. The transmitter 144 is a switch operated handheld radio transmitter 144 that is used to transmit control signals 145 to the receiver 143.

The second load switch 141, the second unload switch 142, the receiver 143, and the transmitter 144 are readily and commercially available as a kit. In the first potential embodiment of the disclosure, a 433 MHz radio frequency remote control product was used.

In a third potential embodiment of the disclosure, the control system 102 further comprises an obstruction circuit 123. The obstruction circuit 123 is an electrical circuit that detects when cargo 173 that is loaded on the carrier belt 112 had been moved to the forward 174 of the trailer 171. When used, the obstruction circuit 123 inhibits the ability to operate the motor 113 in the forward 174 direction when cargo 173 is detected. The obstruction circuit 123 comprises a break beam sensor 151 and an obstruction cutoff switch 152. When used, the obstruction circuit 123 is incorporated into the base motor control circuit 121.

The break beam sensor 151 is a readily and commercially available sensor that is used to detect motion. The break beam sensor 151 monitors a beam of light. Should an object pass into the beam of light the presumption is that the beam of light has been interrupted by cargo 173 loaded within the trailer 171. When the break beam sensor 151 detects a break in the light beam, the break beam sensor 151 sends an electrical signal that opens the obstruction cutoff switch 152.

The obstruction cutoff switch 152 is a readily and commercially available is a double pole single throw normally closed maintained switch. When opened, the obstruction cutoff switch 152 prevents the base motor control circuit 121 and the remote control circuit 122 from supplying the electrical power to further drive the motor 113 in the forward 174 direction. Operation of the invention 100 in the rear 175 direction remains possible when the break beam sensor 151 is activated.

To use the invention 100, cargo 173 is loaded on the carrier belt 112. The control system 102 is then used to move the carrier belt 112 in the forward 174 direction. To unload cargo 173, the cargo 173 at the rear 175 of the trailer 171 is unloaded. The control system 102 is then used to move the carrier belt 112 in the rear 175 until additional cargo 173 stored within the trailer 171 becomes accessible.

The following definitions were used in this disclosure:

Battery: As used in this disclosure, a battery is a container consisting of one or more cells, in which chemical energy is converted into electricity and used as a source of power.

Break Beam Sensor: As used in this disclosure, a break beam sensor is a motion-sensing device. The break beam sensor comprises a beam generator and a beam detector. The beam generator generates a beam of electromagnetic radiation (visible or not visible) that detected by the beam detector. The beam of electromagnetic radiation forms a trip wire in the sense that if an object passes through the transmission of the beam of electromagnetic radiation is interrupted. This interruption of the beam of electromagnetic radiation is detected via the beam detector. The interruption of the beam of electromagnetic radiation is taken to imply that an object has moved through area within which the beam of electromagnetic radiation is transmitted.

Control System: As used in this disclosure, a control system is a first device or system that manages and regulates the behavior or operation of a second device or system.

Diode: As used in this disclosure, a diode is a two terminal semiconductor device that allows current flow in only one direction. The two terminals are called the anode and the cathode. Electric current is allowed to pass from the anode to the cathode.

Electric Ground: As used in this disclosure, an electrical ground is a common reference voltage that is used in the design and implementation of electrical circuits. An electrical ground is often, but not necessarily, the discharge point of electric currents flowing through an electric circuit.

Electric Motor: In this disclosure, an electric motor is a machine that converts electric energy into rotational mechanical energy.

Inferior: As used in this disclosure, the term inferior refers to a directional reference that is parallel to and in the same direction as the force of gravity.

Knurl: As used in this disclosure, a knurl refers to a small knob that projects from a surface. The knob is often, but not necessarily semi-spherical in shape. An object is referred to as "knurled" when the exterior surface of the object is comprises a plurality of knurls arranged in a regular pattern.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Maintained Switch: A used in this disclosure, a maintained switch is a switch that maintains the position that was set in the most recent switch actuation. A maintained switch works in an opposite manner to a momentary switch.

Momentary Switch: As used in this disclosure, a momentary switch is a biased switch in the sense that the momentary switch has a baseline position that only changes when the momentary switch is actuated (for example when a pushbutton switch is pushed). The momentary switch then returns to the baseline position once the actuation is completed. This baseline position is called the "normal" position. So for example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into mechanical energy.

Pulley: As used in this disclosure a pulley is a wheel with a grooved rim around which a cord (or other form of rope, line, or cable) passes. The pulley is used to change the direction of a force applied to the cord.

Roller: As used in this disclosure, a roller is revolving cylindrical device which is used to: 1) move an object; 2) press an object; 3) shape an object; 4) smooth an object; or, 5) crush an object.

Sheeting: As used in this disclosure, sheeting is a material, such as a textile, a plastic, or a metal foil, in the form of a thin flexible layer or layers.

Superior: As used in this disclosure, the term superior refers to a directional reference that is parallel to and in the opposite direction of the force of gravity.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

T Track Fastener: As used in this disclosure, a T track fastener is a fastening device that is used to attach a first object to a second object by sliding the first object on to the second object. The T track fastener further comprises a rail and a channel. The rail is attached to the first object and the channel is attached to the second object such that the first object is attached to the second object when the rail is inserted into the channel.

Tractor: As used in this disclosure, a tractor is a vehicle having a cab, no body and a powerful diesel or gasoline powered engine that is used to pull one or more trailers.

Trailer: As used in this disclosure, a trailer is an unpowered wheeled vehicle that is towed by a powered vehicle.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A cargo loading and unloading device comprising:
   wherein the cargo loading and unloading device comprises a conveyor system and a control system;
   wherein the control system is used to operate the conveyor system;
   wherein the cargo loading and unloading device is configured for use with a trailer;
   wherein the cargo loading and unloading device is configured to be installed as a flooring surface within the trailer;
   wherein the cargo loading and unloading device receives electrical power from an externally provided electrical system;
   wherein the conveyor system comprises a roller bed, a carrier belt, a motor, a drive pulley, and a spindle pulley;
   wherein the motor, drive pulley, and spindle pulley are mounted on the roller bed;
   wherein the roller bed is a structure around which the carrier belt is looped;
   wherein the roller bed forms a supporting platform upon which the cargo is supported;
   wherein the carrier belt moves through a continuous loop around the roller bed;
   wherein the cargo is pulled by the carrier belt;
   wherein the motor is an electrical motor;
   wherein the drive pulley is a pulley that is attached to the motor;
   wherein the spindle pulley attaches to the drive pulley and the motor to form a belt drive;
   wherein the belt drive rotates the carrier belt;
   wherein the spindle pulley is a knurled roller;
   wherein the carrier belt is looped around the roller bed and the spindle pulley such that the knurls of the spindle pulley will press into the surface of the carrier belt;
   wherein the roller bed comprises a plurality of rollers, a left roller guide, and a right roller guide;
   wherein each of the plurality of rollers is a roller that is mounted on a shaft;
   wherein the shaft of each roller selected from the plurality of rollers attaches to a left bearing selected from a left plurality of bearings contained within the left roller guide;
   wherein the shaft of each roller selected from the plurality of rollers attaches to a right bearing selected from a right plurality of bearings contained within the right roller guide;
   wherein each of the plurality of rollers is supported by the left roller guide and the right roller guide such that each of the plurality of rollers spins freely.

2. The cargo loading and unloading device according to claim 1
   wherein the left frame is a rectangular structure that is formed as the rail of a T track fastener;
   wherein the right frame is a rectangular structure that is formed as the rail of a T track fastener;

wherein the left frame runs along the left side of the trailer;

wherein the right frame runs along the right side of the trailer.

3. The cargo loading and unloading device according to claim 2 wherein each left bearing selected from the left plurality of bearings attaches to the shaft of a roller selected from the plurality of rollers;

wherein each right bearing selected from the right plurality of bearings attaches to the shaft of a roller selected from the plurality of rollers.

4. The cargo loading and unloading device according to claim 3 wherein the control system is an electric circuit that is stored within a housing mounted at the rear of the trailer.

5. The cargo loading and unloading device according to claim 4 wherein the control system comprises a base motor control circuit;

wherein the base motor control circuit is an electrical circuit that controls the operation and the direction of rotation of the motor that rotates the conveyor system.

6. The cargo loading and unloading device according to claim 5 wherein the base motor control circuit comprises an enablement switch, a first load switch, a first unload switch, a battery, a charging connection, and a diode;

wherein the first load switch, the first unload switch, the battery, the charging connection, and the diode are electrically interconnected;

wherein the enablement switch is a single pole single throw maintained switch;

wherein the first load switch is a double pole single throw normally open momentary switch;

wherein the first load switch rotates the motor to move the carrier belt in the forward direction;

wherein the first unload switch is a double pole single throw normally open momentary switch;

wherein the first unload switch rotates the motor to move the carrier belt in the rear direction;

wherein the chemical energy stored within the battery is renewed and restored through use of the tractor electrical system;

wherein the charging connection forms the electrical connection between the battery and the tractor electrical system;

wherein the charging connection is an electrical circuit that reverses the polarity of the battery and provides the energy necessary to reverse the chemical processes that the battery initially used to generate the electrical energy;

wherein the diode is an electrical device that prevents the flow of electrical current from the battery into the tractor electrical system.

7. The cargo loading and unloading device according to claim 6 wherein the control system further comprises a remote control circuit;

wherein the remote control circuit is incorporated into the base motor control circuit;

wherein the remote control circuit is an electrical circuit that allows the base motor control circuit to be operated using a transmitter and a receiver.

8. The cargo loading and unloading device according to claim 7 wherein the remote control circuit comprises a second load switch, a second unload switch, a receiver, and a transmitter;

wherein the second load switch is a radio controlled double pole single throw normally open momentary switch;

wherein the second load switch rotates the motor to move the carrier belt in the forward direction;

wherein the second load switch is a radio controlled double pole single throw normally open momentary switch;

wherein the second unload switch rotates the motor to move the carrier belt in the rear direction;

wherein the receiver is a radio frequency receiver that receives a control signal from the transmitter;

wherein the control signal initiates the opening and closing of the second load switch and the second unload switch;

wherein the transmitter is a switch operated handheld radio transmitter that is used to transmit control signals to the receiver.

9. The cargo loading and unloading device according to claim 6 wherein the control system further comprises an obstruction circuit;

wherein the obstruction circuit is an electrical circuit that detects when cargo that is loaded on the carrier belt has been moved to the forward of the trailer;

wherein the obstruction circuit inhibits the ability to operate the motor in the forward direction when cargo is detected.

10. The cargo loading and unloading device according to claim 9 wherein the obstruction circuit comprises a break beam sensor and an obstruction cutoff switch;

wherein the obstruction circuit is incorporated into the base motor control circuit;

wherein the break beam sensor monitors a beam of light;

wherein when the break beam sensor detects a break in the light beam, the break beam sensor sends an electrical signal that opens the obstruction cutoff switch;

wherein the obstruction cutoff switch is a is a double pole single throw normally closed maintained switch;

wherein when opened the obstruction cutoff switch prevents the base motor control circuit from supplying the electrical power to further drive the motor in the forward direction;

wherein operation of the cargo loading and unloading device in the rear direction remains possible when the obstruction cutoff switch is open.

11. The cargo loading and unloading device according to claim 8 wherein in a the control system further comprises an obstruction circuit;

wherein the obstruction circuit is an electrical circuit that detects when cargo that is loaded on the carrier belt has been moved to the forward of the trailer;

wherein the obstruction circuit inhibits the ability to operate the motor in the forward direction when cargo is detected;

wherein the obstruction circuit comprises a break beam sensor and an obstruction cutoff switch;

wherein the obstruction circuit is incorporated into the base motor control circuit;

wherein the break beam sensor monitors a beam of light;
wherein when the break beam sensor detects a break in the light beam, the break beam sensor sends an electrical signal that opens the obstruction cutoff switch;
wherein the obstruction cutoff switch is a is a double pole single throw normally closed maintained switch;
wherein when opened the obstruction cutoff switch prevents the base motor control circuit and the remote control circuit from supplying the electrical power to further drive the motor in the forward direction;
wherein operation of the cargo loading and unloading device in the rear direction remains possible when the obstruction cutoff switch is open.

* * * * *